United States Patent [19]

Fujimoto et al.

[11] 3,932,359

[45] Jan. 13, 1976

[54] POLYURETHANES BASED ON AMINO-ACIDS OR DERIVATIVES THEREOF

[75] Inventors: Yasuo Fujimoto, Yokohama; Keizo Tatsukawa, Machida; Masayuki Teranishi, Machida; Shinsuke Koshimoto, Machida, all of Japan; Toru Doiuchi, Dusseldorf, Germany

[73] Assignee: Kyowa Hakko Kogyo Co., Ltd., Japan

[22] Filed: Aug. 29, 1973

[21] Appl. No.: 392,756

Related U.S. Application Data

[63] Continuation-in-part of Ser. No. 100,838, Dec. 22, 1970, abandoned.

[30] Foreign Application Priority Data

Dec. 25, 1969 Japan.............................. 44-103765

[52] U.S. Cl..... 260/77.5 R; 260/77.5 AT; 260/858; 428/423; 428/425; 428/901
[51] Int. Cl.²................. B32B 27/40; C08G 18/30; C08G 18/64
[58] Field of Search...... 260/77.5 R, 77.5 CA, 78 A

[56] References Cited
UNITED STATES PATENTS

| | | | |
|---|---|---|---|
| 3,488,324 | 1/1970 | Garber et al. | 260/77.5 AT |
| 3,634,544 | 1/1972 | Takeda et al. | 260/78 A |
| 3,655,628 | 4/1972 | Uchida et al. | 260/77.5 CA |
| 3,725,353 | 4/1973 | Fujimoto et al. | 260/77.5 CA |
| 3,761,451 | 9/1973 | Fujimoto et al. | 260/77.5 CA |

*Primary Examiner*—H. S. Cockeram
*Attorney, Agent, or Firm*—Craig & Antonelli

[57] ABSTRACT

Amino acid-urethane copolymers improved in elongation, tensile strength and flexing endurance are prepared by polymerizing a prepolymer having terminal isocyanate groups, obtained by reacting a polyether polyol having hydroxyl groups substantially at the terminals thereof with an organic polyisocyanate in a ratio in equivalent of the organic polyisocyanate to the polyether polyol of 1.6 to 2.5, either with an amino acid-N-carboxylic acid anhydride or with a polyamino acid polymer obtained by polymerizing an amino acid-N-carboxylic acid anhydride.

19 Claims, 16 Drawing Figures

POLYURETHANES BASED ON AMINO-ACIDS OR DERIVATIVES THEREOF

CROSS-REFERENCE TO RELATED APPLICATION

This application is a continuation-in-part application of our application Ser. No. 100,838 filed December 22, 1970 now abandoned.

SUMMARY OF THE INVENTION

This invention relates to a process for producing improved amino acid-urethane copolymers. More particularly, it relates to a process for producing amino acid-urethane copolymers improved in elongation, tensile strength and flexing endurance, the process being characterized by polymerizing a prepolymer having terminal isocyanate groups, obtained by reacting a polyether polyol having hydroxyl groups substantially at the terminals thereof with an organic polyisocyanate in a ratio in equivalent of the organic polyisocyanate to the polyether polyol (the ratio is hereinafter referred to as "ratio of NCO/OH" or simply "NCO/OH") of 1.6 to 2.5, either with an amino acid-N-carboxylic acid anhydride (hereinafter referred to as ANCA) or with a polyamino acid polymer obtained by polymerizing an ANCA.

It is well known in the art that polyamino acid polymers are similar to natural leather in properties such as moisture permeability, touch, feeling, etc., when a polyamino acid polymer itself is made into a film or coated onto a substrate cloth such as a woven fabric or non-woven fabric and, thus, is an advantageous material. However, polyamino acid polymers have the disadvantage that it is considerably difficult to use them as wearing materials and the like, because they do not have sufficient elongation and resilience. Furthermore, when a polyamino acid polymer is coated onto a woven fabric or non-woven fabric and used as a leather, it is necessary to use a suitable adhesive because the polyamino acid polymer itself has no adhesiveness. In this case, great difficulties have been encountered in selecting suitable adhesives. Hence, improvements in the adhesiveness, elongation and like properties have long been sought in the art.

By U.S. Pat. No. 3,655,628 there is known a process for producing amino acid-urethane copolymers which comprises reacting a prepolymer obtained from an organic diisocyanate and a polyether polyol with an ANCA. These copolymers are considerably improved in elongation, adhesiveness, elasticity and the like when compared with the aforementioned polyamino acid polymers. However, such copolymers produced by a known method are still unsatisfactory in elongation, tensile strength and flexing endurance.

As a result of much research for improvement of the amino acid-urethane copolymers, the present inventors have found that the copolymers obtained by using the prepolymers prepared by reacting an organic polyisocyanate with a polyether polyol in a ratio of the isocyanate to the polyol within a particular range, have improved elongation, tensile strength and flexing endurance. The present invention has been accomplished based on this finding.

In the U.S. Pat. No. 3,655,628, a prepolymer is prepared by reacting an organic diisocyanate with a polyether polyol having terminal hydroxyl groups in a ratio of NCO/OH of 1.38 (cf column 3, Experimental Example A). The thus prepared prepolymer is reacted with an ANCA, whereby an amino acid-urethane copolymer, which is improved in elongation, adhesiveness and elasticity in comparison with conventional polyamino acid polymers, is obtained.

BRIEF DESCRIPTION OF THE DRAWINGS

This invention will be further understood from the following detailed description and the accompanying drawings wherein FIGS. 1-1, 1-2, 2-1, 2-2, 3-1, 3-2, 4-1, 4-2, 5-1, 5-2, 6-1, 6-2, 7-1, 7-2, 8-1, and 8-2, respectively, show graphical representations of the relationship between the ratios of the polyisocyanate to the polyol in the copolymers of the present invention and the properties of the films molded from these copolymers.

DETAILED DESCRIPTION

In the process of the present invention, a prepolymer is prepared by reacting a polyether polyol having hydroxyl groups substantially at the terminals thereof with an organic polyisocyanate, most preferably with diisocyanate in a ratio of NCO/OH of 1.6 to 2.5. The prepolymer is reacted either with an ANCA or with a polyamino acid polymer obtained by polymerizing an ANCA. The thus obtained amino acid-urethane copolymer is remarkably improved in elongation, tensile strength and flexing endurance when compared with the products produced by using the prepolymers obtained by reacting the organic polyisocyanates with the polyether polyols in the other ratios.

The polyether polyols employed in the present process are those having a molecular weight of 300 to 5,000, preferably 400 to 2,000 and having hydroxyl groups substantially at the terminals thereof. Specifically, the suitable polyether polyols are: (a) ring-cleaved polymers of alkylene oxides having 2 to 8 carbon atoms (for example, cyclic ethers such as ethylene oxide, propylene oxide, oxetane, butylene oxide, tetrahydrofuran, tetrahydropyran, 1,2-epoxypentane, 2,3-epoxypentane, 1,2-epoxyhexane, 2,3-epoxyhexane, 1,2-epoxyheptane, 1,2-epoxyoctane, isobutylene epoxide, 2,5-dimethyltetrahydrofuran, 2,4-dimethyl-3-hydroxymethyltetrahydrofuran, dioxane, etc.), (b) mixtures of said ring-cleaved polymers, (c) condensates of said alkylene oxides and alkylene glycols having 2 to 6 carbon atoms (for example, ethylene glycol, propylene glycol, dipropylene glycol, tetramethylene glycol, butanediols, hexanediols and mixtures thereof), the condensates being prepared in the presence of a suitable catalyst or initiator (for example, trialkylamines such as trimethylamine, triethylamine, etc.; inorganic bases such as potassium hydroxide, etc.; and halogenides such as boron trifluoride, etc.) and (d) condensates of one or more of said alkylene glycols. These polyether polyols and methods for preparing them are known in the art. See, for example, Saunders et al.: Chemistry and Technology of Polyurethanes, Part I, Chemistry of High Polymers, Vol. 16, Pages 32 to 44 (Interscience Publishers, 1962).

It has been found that amino acid-urethane copolymers obtained by using polyether polyols having linear chains exhibit higher elongations than those obtained by using polyether polyols having side chains. In the present process, the linear chain polyether polyols containing 4 to 6 —$CH_2$— groups as repeating units, are preferably used.

As the organic polyisocyanate, organic diisocyanates such as aliphatic, alicyclic and aromatic diisocyanates are usually employed. Particularly prefered diisocyanates are aliphatic diisocyanate compounds having an ester group (for example, lysine diisocyanate methyl ester, ornithine diisocyanate methyl ester, etc.), hexane-1,6-diisocyanate, dicyclohexylmethane-4, 4'-diisocyanate, tolylene diisocyanates, diphenylmethane-4, 4'-diisocyanate, etc. Mixtures thereof can also be used, if desired. However, polymers produced from polyisocyanates and polyols, i.e., so-called polyurethanes, generally possess the disadvantage that they deteriorate or discolor when exposed to ambient atmospheric conditions such as sunlight or the like and, hence, particular care should be used in selecting the employed diisocyanate. Such disadvantages are particularly noted on the prepolymers from aromatic diisocyanates, for example, tolylene diisocyanates, diphenylmethane-4, 4'-diisocyanate, and the like. Therefore, it is preferable to select a diisocyanate in view of the intended use of the product. As a result of various studies, the present inventors have found that the amino acid-urethane copolymers produced according to the present process using aliphatic diisocyanates having an ester group (for example, lysine diisocyanate alkyl ester and ornithine diisocyanate alkyl ester), have excellent properties, that is, these copolymers exhibit very little discoloration and a very good resistance to light when exposed to sunlight or the like. Further, since the thus obtained amino acid-urethane copolymers have ester groups within their molecule, they are superior with regard to, for example, resistance to solvents and resilience as compared with the amino acid-urethane copolymers obtained by using the other diisocyanates.

Typical examples of aliphatic diisocyanate compounds having at least one ester group are given below, and an almost similar effect can be observed when any of these compounds are used in place of the compounds shown in the working examples: esters of methyl, ethyl, n-propyl, i-propyl, n-butyl and its isomers, n-pentyl and its isomers, n-hexyl and its isomers, n-octyl and its isomers, n-decyl and its isomers, n-dodecyl and its isomers, stearyl, palmityl, methoxymethyl, ethoxymethyl, 2-methoxyethyl, 2-ethoxyethyl, 3-methoxypropyl, 3-ethoxypropyl, 4-methoxybutyl, 4-ethoxybutyl, phenyl, benzyl, o-tolyl, m-tolyl, p-tolyl, phenylethyl, p-tolylmethyl, o-tolymethyl, m-tolylmethyl, o-(2-chlorotolyl), 2-chloroethyl, 2-bromoethyl, 2-chloropropyl, 3-chloropropyl, 1,2-dichloropropyl, 2,3-dichloropropyl, cyclobutyl, cyclopropyl, cyclopentyl, cyclohexyl, cycloheptyl, cyclooctyl, cyclodecyl, cyclopentylmethyl, cyclohexylmethyl, cyclobutylmethyl, o-methylcyclohexyl and its isomers, and 2-methylcyclohexylmethyl and its isomers of 2,6-diisocyanate caproic acid (lysine diisocyanate), 2,4-diisocyanate butyric acid, 2,5-diisocyanate valeric acid (ornithine diisocyanate), 2,5-diisocyanate caproic acid, 2,7-diisocyanate heptanoic acid, 2,5-diisocyanate heptanoic acid, and 2,8-diisocyanate caprylic acid; diesters of dimethyl, diethyl, dipropyl(di-n-propyl and di-i-propyl), dibutyl(n-, i- and tert-), dioctyl, didecyl, didodecyl, distearyl, diphenyl, dibenzyl, di(o-tolyl), di(m-tolyl), di($\beta$-phenylethyl), di(p-tolylmethyl), di[o-(2-chlorotolyl)], di(2-chloroethyl), di(2-chloropropyl), di(3-chloropropyl), di(2,3-dichloropropyl), di(-methoxymethyl), di(2-methoxyethyl), di(2-ethoxyethyl), di(2-propoxyethyl), di(2-butoxyethyl), di(cyclohexyl), di(cyclopentyl) and di(cyclohexylmethyl) of 2,4-diisocyanate glutaric acid, 2,5-diisocyanate adipic acid, 2,6-diisocyanate pimelic acid, 2,7-diisocyanate suberic acid, 2,9-diisocyanate sebacid acid, 2,4-diisocyanate adipic acid and 2,4-diisocyanate pimelic acid; and the following mixed diesters, for example, diesters of methyl-ethyl, methyl-propyl, methyl-butyl, ethyl-propyl, ethyl-butyl, n-propyl-i-propyl, propyl-butyl, phenyl-octyl, benzyl-stearyl and methyl-benzyl of said acids.

The compounds used in the present invention can be either optically active or inactive. In preparing the prepolymer having isocyanate groups at its terminal positions, the reaction of the polyether polyol with the diisocyanate can be carried out, in view of the succeeding reaction with an ANCA, in the absence of a solvent or in the presence of a proper solvent that is incapable of reacting with the raw material compounds under the reaction conditions, but is capable of dissolving at least one of the raw materials, for example, urethane solvents such as ethers, for example, dioxane and the like, dialkylformamide, dialkylacetamide, xylene, toluene, cellosolve acetate and 2-ethoxyethyl acetate and halogenated hydrocarbon solvents such as chloroform, ethane dichloride, tetrachloroethane, trichloroethylene, etc. Furthermore, in this case, the reaction proceeds sufficiently without a catalyst at normal or room temperature, but in order to accelerate the reaction rate, heating is carried out or a suitable catalyst that does not inhibit the polymerization reaction with an ANCA substantially, for example, the well-known catalysts used in the production of polyurethanes (for example, organic bases, organometallic compounds, etc.) are used. Typical examples of such catalysts are the following: trimethylamine; triethylamine; tripropylamine(n- and iso-); tributylamine(n-, iso-, tert- and sec-); tripentylamine; trihexylamine; tricyclohexylamine; tricyclopentylamine; N,N-dimethyllauryl-amine; triethanolamine; methyldiethanolamine; dimethylethanolamine; ethyldiethanolamine; diethylethanolamine; tris(2-oxypropyl)amine; N,N-dimethylcyclohexylamine; triethylenediamine; N,N,N'N'-tetramethylmethanediamine; N,N,N',N'-tetraethylmethanediamine; N,N,N',N'-tetramethyl-ethylenediamine; N,N,N',N'-tetraethylethylenediamine; N,N,N',N'-tetrakis(2-hydroxypropyl)ethylenediamine; N,N,N',N'-tetramethylpropylenediamine; N,N,N',N'-tetramethyl-1,3-butanediamine; N,N,N',N'-tetramethylhexamethylenediamine; N,N,N',N'',N''-pentamethyldiethylenetriamine; N,N,N',N'',N''',N''''-hexamethyltriethylenetetramine; N,N,N',N'-tetraethyl-1,3-butanediamine; dimethylamine; diethylamine; dipropylamine; dibutylamine; dipentylamine; dihexylamine; dicyclopentylamine; dicyclohexylamine; triazine; morpholine, N-methylmorpholine; N-ethylmorpholine; piperidine; piperazine; N-methylpiperazine; N,N'-diethylpiperazine; pyridine; dibenzylamine; tribenzylamine; N-methylaniline; N-ethylaniline; N,N-dimethylaniline; N,N-diethylaniline; diphenylamine; triphenylamine; N,N,N',N'-tetramethyl-p-phenylenediamine; N,N,N',N'-tetraethylphenylenediamine; dibutyl(propyl, ethyl and methyl) tin diacetate; dibutyl(propyl, ethyl and methyl) tin dibutyrate; dibutyl(propyl, ethyl and methyl) tin divalerate; dibutyl(propyl, ethyl and methyl) tin dioctanoate; dibutyl(propyl, ethyl and methyl) tin dilaurate; butyl(propyl, ethyl and methyl) tin trichloride; dibutyl(propyl, ethyl and methyl) tin di-2-ethylhexanoate; zinc, nickel, cobalt, iron, tin and lead naphthenates; tin oleate; iron, nickel, cobalt and tin octanoates; ferrocene; hexogen copper; iron acetylacetonate; etc.

These catalysts can be used alone or in a mixture, or may be diluted with or dissolved in a suitable solvent, and added to the reaction system. The catalyst is usually employed in an amount corresponding to 5% by mole or less on the basis of the total weight of the polyether polyol initially employed.

Then, the prepolymer having the isocyanate groups at the terminal positions thereof is polymerized with an ANCA in the presence of a polymerization initiator or with a polyamino acid polymer obtained by polymerizing an ANCA in advance.

The amino acid-N-carboxylic acid anhydrides (ANCA) employed in the present process are represented by the following formulae:

(wherein R and $R^1$ represent hydrogen atoms or monovalent organic residues, and $R^2$ and $R^3$ represent divalent organic residues).

The amino acids in said amino acid-N-carboxylic acid anhydrides (ANCA) include acidic amino acids, neutral amino acids and basic amino acids. In the NCA prepared from acidic amino acids, for example, ω-substituted ester compounds having the following general formulae are included:

wherein $p$ is a whole integer such as 1, 2, 3, 4, etc.; $R_x$ is a monovalent hydrocarbon residue [the term "hydrocarbon residue" referring to saturated or unsaturated aliphatic, alicyclic or aromatic (including aromatic-aliphatic, aliphatic-aromatic and aliphatic-aromatic-aliphatic) hydrocarbon moieties having 1–30 carbon atoms, which may include residues having various substituent groups, for example, chloro, bromo, fluoro, nitro, cyano, alkoxy, carboalkoxy, carboaryloxy, carboalkaryloxy, carboaralkoxy, mono- or dialkylated amino, acylated amino, carboalkoxy amino, carboaralkoxy amino groups, etc.] and $R_y$ is an alkylene group of 2 to 10 carbon atoms. More specifically, these ANCA include NCA of aspartic acid, glutamic acid, 2-aminoadipic acid, 2-aminopimelic acid, etc. In the N-carboxylic acid anhydrides (NCA) of neutral amino acids, the following compounds are included: NCA of amino acids such as glycine, alanine, α-aminobutyric acid, α,δ-diaminopimelic acid, valine, norvaline, leucine, isoleucine, norleucine, phenylglycine, phenylalanine, tryptophan, proline, β-alanine, β-aminobutyric acid, β-aminoisovaleric acid, β-aminocaproic O-substituted serine, O-substituted homoserine, O-substituted threonine, O-substituted tyrosine, O-substituted hydroxyproline, O-substituted hydroxytryptophan, S-substitued cysteine, cystine and methionine. In the NCA of basic amino acids, the following are, for example, included: NCA of N-$^{im}$ substituted histidine; N-$^\gamma$ substituted-α,γ-diaminobutyric acid; N-$^\delta$ substituted ornithine; N-$^\epsilon$ substituted lysine; N$^{guanido}$-substituted arginine and others.

Known initiators of NCA, that is, said organic bases and organometallic compounds (for example, alkyllithium, dialkyl zinc, monoalkyl zinc, sodium alkoxides, etc.) may be used as a suitable polymerization initiator.

A good result can usually be obtained when the ANCA is used in an amount of 0.2 to 2.0 times the weight of the prepolymer having the isocyanate groups at the terminals, but the amount of ANCA can be changed appropriately depending upon the desired physical properties of the amino acid-urethane copolymers to be obtained, i.e., depending upon the desired elongation, adhesiveness, resilience, feeling, moisture permeability, touch, etc.

Generally speaking, when too much polyamino acid polymer is used, the physical properties of the polyamino acid polymer become predominant, whereas when too little polyamino acid polymer is used, the physical properties of the polyurethane become predominant according to the kinds of polyether polyol and diisocyanate used.

The polymerization temperature and time to be employed depend upon the combination of the employed reactants, the employed solvent, etc., but when the reaction is carried out at an elevated temperature for a long time, a considerable color change may take place. In view of this fact, it is usually preferable to carry out the reaction for 1–20 hours at a temperature of 200°C. or less. As the reaction proceeds even at a low temperature, cooling may be effected. Usually, it is most preferable to use a temperature of 0°–100°C. When the prepolymer having the isocyanate groups at the terminal positions is polymerized with a polyamino acid polymer separately prepared from an ANCA according to the conventional method, a good result can be obtained by carrying out the reaction under the same conditions as said reaction conditions, but in this case, it is desirable to complete the reaction by heating just before the reaction is finished.

The amount of the polymerization initiator used in the polymerization of an ANCA or polyamino acid polymer with a prepolymer depends upon the components in the reaction mixture, the type of the initiator and the desired objective of the reaction. Usually, it is desirable to use 0.005–1.0 mole of the polymerization initiator per mole of the ANCA employed.

Polymerization is usually carried out in a solvent which is capable of dissolving at least one of the reactants and which is inert to these reactants, but it is desirable that the solvent does not react with the raw materials under the reaction conditions used. As the solvent, the following inert organic solvents are preferably used: N,N-dialkylamides such as dialkylformamide, dialkylacetamide, N-alkyl-2-pyrrolidone, etc. and halogenated hydrocarbons such as chloroform, ethane dichloride, trichlene, tetrachloroethylene, tetrachloroethane, methylene chloride, etc. Organic ethers, such as dioxane, and organic esters of carboxylic acids, such as ethyl acetate, can likewise be used. It is possible to use these solvents alone or in mixture, and further it is possible to add thereto aromatic hydrocarbons or halogenated aromatic hydrocarbons, such as benzene, toluene, nitrobenzene, chlorobenzene, etc. The amount of the polymerization solvent to be used is not particularly limited, so long as it is sufficient to form a good polymerization system, but an amount of solvent is usually employed such that it may contain 1–50% of solid components.

The amino acid-urethane copolymers of the present invention are much improved in elongation, tensile strength and flexing endurance. Further, the copolymers produced according to the present process using aliphatic diisocyanates having an ester group (for example, ornithine diisocyanate alkyl ester, lysine diisocyanate alkyl ester, etc.) have remarkably good resistance to solvents and light in addition to very good adhesiveness, elongation, tensile strength and flexing endurance. Therefore, an excellent artificial leather can be prepared by coating a substrate cloth of woven or non-woven fabrics with the present amino acid-urethane copolymer, and the thus-prepared artificial leather can be used for manufacturing shoes, bags and clothing. Cotton cloth has been found to be a particularly desirable substrate. As to the color change of polymers having a comparatively poor resistance to light, it can be prevented to some degree by using a coloring agent.

The following examples are give merely as illustrative of the present invention and are not to be considered as limiting.

EXAMPLE 1

44 g of polyoxytetramethylene glycol having an OH value of 51.0 obtained by ring cleavage polymerization of tetrahydrofuran, 8.5 g of lysine diisocyanate methyl ester (hereinafter referred to as LDIM) and 40 g of dioxane were mixed (NCO/OH = 2.0). The mixture was subjected to reaction at 100°C. for 40 minutes with stirring, whereby a prepolymer having isocyanate groups at the terminal positions was obtained (hereinafter referred to as prepolymer $A_1$). Then, 450 g of ethane dichloride was immediately added thereto, and 73.0 g of γ-methyl-L-glutamate-N-carboxylic acid anhydride was added thereto. After stirring at room temperature for 1 hour, 70 g of N,N-dimethylformamide was added thereto. After adding 1.31 g of the polymerization initiator, triethylamine thereto, stirring was continued for 10 hours. Then, the temperature was elevated to near the boiling point by heating, and the reaction was continued for 1 hour, whereby a viscous solution of copolymer was obtained (this solution is referred to as copolymer $a_1$.). A film was molded from copolymer $a_1$ by a dry process, giving a colorless, transparent film. Copolymer $a_1$ did not turn to a yellow color even after 30 days and had a very superior resistance to light as compared with the copolymers prepared in the same manner by using other diisocyanates, for example, 4,4′-diphenylmethane diisocyanate and tolylene diisocyanate. As for the obtained film, comparative values are given below, comparing the properties with those of a film of poly-γ-methyl-L-glutamate (the thicknesses of these two films were 0.04 – 0.05 mm.).

| Film of poly-γ-methyl-L-glutamate | | |
|---|---|---|
| Tensile strength: | longitudinal | 3.0 kg./mm² |
| | lateral | 5.0 kg/mm² |
| Elongation: | longitudinal | 90% |
| | lateral | 110% |
| Film prepared from copolymer $a_1$ | | |
| Tensile strength: | longitudinal | 2.0 kg/mm² |
| | lateral | 2.3 kg/mm² |
| Elongation: | longitudinal | 300% |
| | lateral | 350% |

When copolymer $a_1$ was applied onto a cotton suede, a coating film having strong adhesiveness and requiring no adhesive at all was formed.

Further, four kinds of prepolymers (prepolymers $B_1$, $C_1$, $D_1$ and $E_1$) were prepared in the same manner as in the preparation of prepolymer $A_1$, except that respectively different amounts of LDIM were used. Five kinds of copolymer solutions (copolymers $b_1$, $c_1$, $c'_1$, $d_1$ and $e_1$) were prepared from prepolymers $B_1$, $C_1$, $D_1$ and $E_1$ and γ-methyl-L-glutamate-N-carboxylic acid anhydride in the same manner as in the preparation of copolymer $a_1$. Films having a thickness of 0.04 – 0.05 mm. were molded from the copolymers by a dry process and were tested on tensile strength and elongation. Detailed data are shown in Table 1.

Table 1

| Prepolymer | | $A_1$ | $B_1$ | $C_1$ | | $D_1$ | $E_1$ |
|---|---|---|---|---|---|---|---|
| LDIM (g) | | 8.5 | 6.8 | 5.94 | | 10.6 | 11.9 |
| NCO/OH (equivalent) | | 2.0 | 1.6 | 1.4 | | 2.5 | 2.8 |
| Copolymer | | $a_1$ | $b_1$ | $c_1$ | $c'_1$ | $d_1$ | $e_1$ |
| Prepolymer | | 52.5/73 | 50.8/70.6 | 49.9/69.4 | 49.9/73 | 54.6/75.9 | 55.9/77.7 |
| NCA of γ-methyl-L-glutamate (g/g) | | (0.720) | (0.720) | (0.720) | (0.684) | (0.720) | (0.720) |
| Prop-erties of the films | Tensile strength: (kg/mm²) | | | | | | |
| | Longitudinal: | 2.0 | 1.8 | 1.2 | 1.3 | 1.7 | 1.4 |
| | Lateral: | 2.3 | 2.0 | 1.4 | 1.5 | 1.9 | 1.4 |
| | Elongation: (%) | | | | | | |
| | Longitudinal: | 300 | 280 | 150 | 140 | 300 | 260 |
| | Lateral: | 350 | 330 | 180 | 160 | 330 | 280 |

Figure 11:
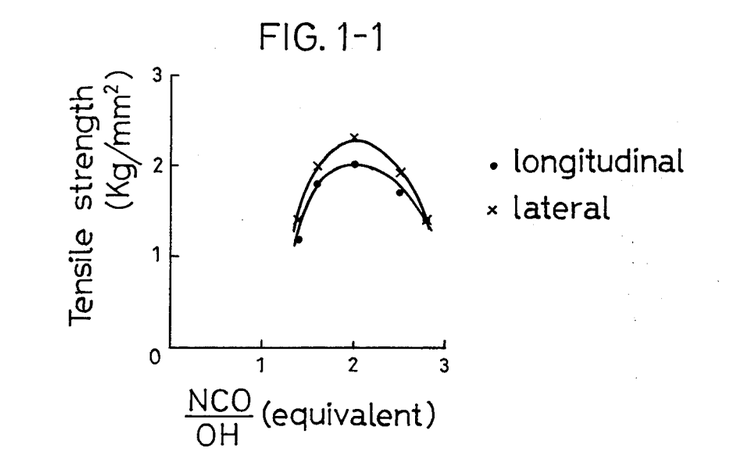
Figure 12:
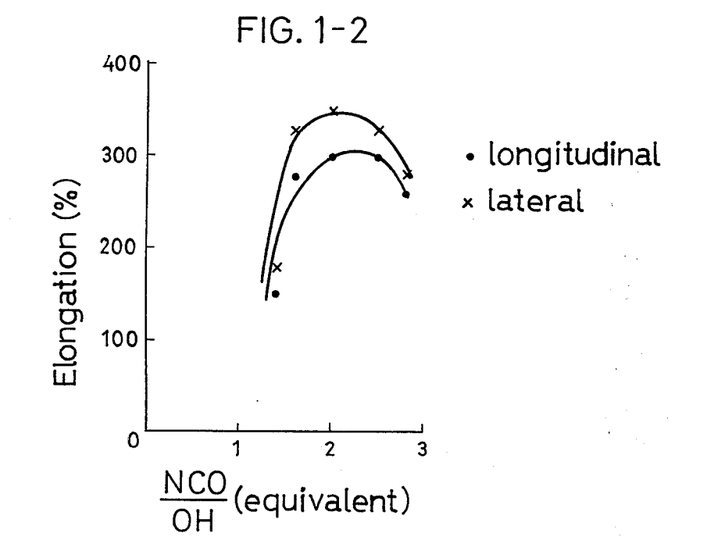

The relations between the ratios of the polyisocyanate to the polyol and the properties of the films molded from copolymers $a_1$, $b_1$, $c_1$, $d_1$ and $e_1$ mentioned in Table 1 are shown in FIGS. 1-1 and 1-2.

Each of copolymers $a_1$, $b_1$, $c_1$, $c'_1$, $d_1$ and $e_1$ was diluted with 1,2-dichloroethane by 3 times the volume. The resulted solutions were coated on foamed vinylchloride leathers. In the cases of copolymers $a_1$, $b_1$, $d_1$ and $e_1$, the coated surfaces had a good gloss. Whereas, in the cases of copolymers $c_1$ and $c'_1$, whitening was observed on the coated surfaces. In the anti-flex test of the coated leathers with Flexometer, the surfaces of the leathers coated with the copolymers were observed tested on tensile strength and elongation. Detailed data are shown in Table 2.

Table 2

| Prepolymer | | $A_2$ | $B_2$ | | $C_2$ | | $D_2$ | $E_2$ |
|---|---|---|---|---|---|---|---|---|
| ODIE (g) | | 8.5 | 4.9 | | 2.45 | | 5.8 | 9.82 |
| NCO/OH (equivalent) | | 2.44 | 1.4 | | 0.7 | | 1.6 | 2.8 |
| Copolymer | | $a_2$ | $b_2$ | $b'_2$ | $c_2$ | $c'_2$ | $d_2$ | $e_2$ |
| Prepolymer NCA of γ-methyl-L-glutamate (g/g) | | 54.5/70 (0.778) | 50.9/70 (0.726) | 50.9/65.6 (0.778) | 48.45/70 (0.692) | 48.45/62.3 (0.778) | 53.8/69.0 (0.778) | 55.8/71.7 (0.778) |
| Properties of the films | Tensile strength (kg/mm²) | | | | | | | |
| | Longitudinal: | 2.0 | 1.2 | 1.1 | 1.1 | 1.0 | 1.8 | 1.5 |
| | Lateral: | 2.3 | 1.5 | 1.4 | 1.4 | 1.3 | 2.0 | 1.6 |
| | Elongation (%) | | | | | | | |
| | Longitudinal: | 300 | 160 | 170 | 150 | 160 | 290 | 200 |
| | Lateral: | 350 | 200 | 200 | 180 | 190 | 320 | 230 | after every 10,000 flexing runs. In the following Examples, the anti-flex tests were carried out in the same manner as in this Example. The leathers coated with copolymers $c_1$, $c'_1$ and $e_1$ had cracks on the surfaces after 250,000 runs, while those coated with copolymers $a_1$, $b_1$ and $d_1$ exhibited no crack.

EXAMPLE 2

8.5 g of ornithine diisocyanate ethyl ester (hereinafter referred to as ODIE) and 40 g of dioxane were added to 46 g of polyoxytetramethylene glycol having an OH value of 40.0 obtained by ring cleavage polymerization of tetrahydrofuran (NCO/OH = 2.44). The mixture was subjected to reaction at 100°C for 50 minutes with stirring, whereby a prepolymer having isocyanate groups at the terminals was obtained (this prepolymer is referred to as prepolymer $A_2$). Then, a polymerization solution separately obtained by polymerizing 70.0 g of γ-methyl-L-glutamate-N-carboxylic acid anhydride in 450 g of ethane dichloride using 20 g of triethylamine as an initiator was immediately added thereto. The solution mixture was heated at 75°–80°C. for 1 hour with stirring to complete the reaction. A polymerization solution having a viscosity of 1,500-2,000 c.p.s. was obtained (this solution is referred to as copolymer $a_2$). The film obtained from copolymer $a_2$ by the conventional method had physical properties similar to those of the polymer film obtained from copolymer $a_1$.

Further, four kinds of prepolymers (prepolymers $B_2$, $C_2$, $D_2$ and $E_2$) were prepared in the same manner as in the preparation of prepolymer $A_2$, except that respectively different amounts of ODIE were used. Six kinds of copolymer solutions (copolymers $b_2$, $b'_2$, $c_2$, $c'_2$, $d_2$ and $e_2$) were prepared from prepolymers $B_2$, $C_2$, $D_2$ and $E_2$ and NCA of γ-methyl-L-glutamate according to the procedures in the production of copolymer $a_2$. The copolymers obtained by using prepolymers $A_2$ and $D_2$, i.e. copolymers $a_2$ and $d_2$ were more transparent than the others.

Figure 21:
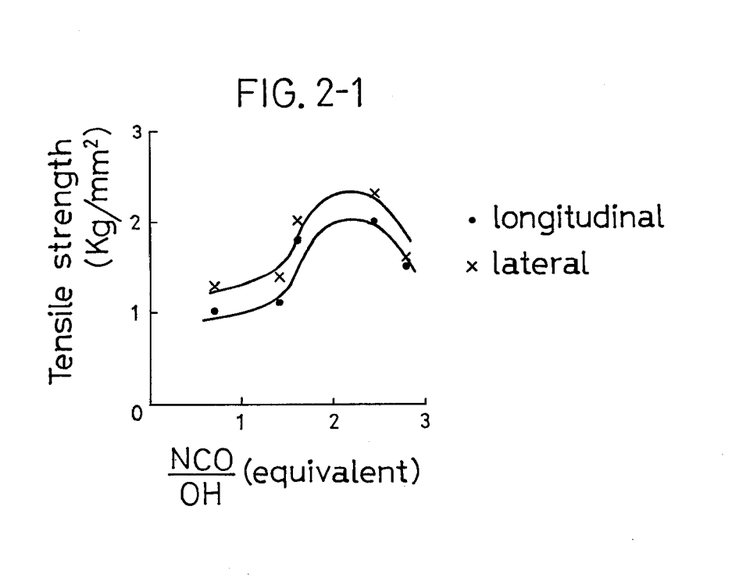
Figure 22:
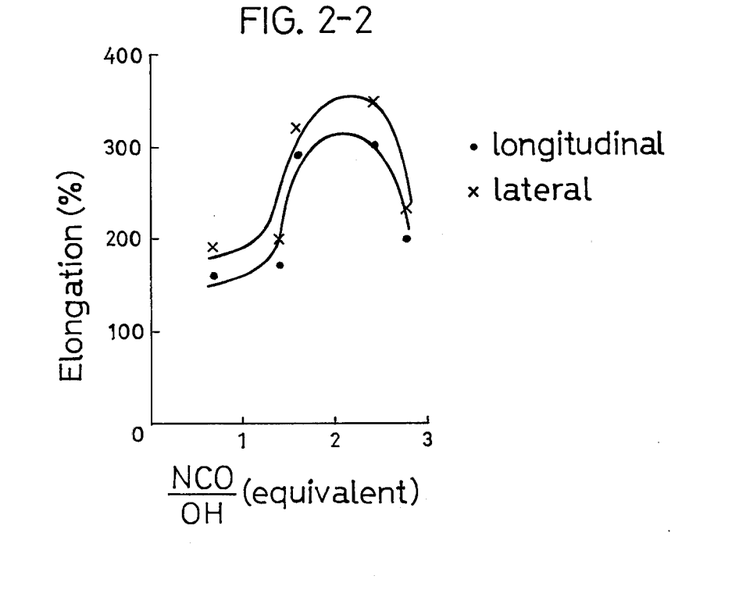

Films having a thickness of 0.04 – 0.05 mm were molded from the copolymers by a dry process and were The relations between the ratios of NCO/OH and the properties of the films molded from copolymers $a_2$, $b'_2$, $c'_2$, $d_2$ and $e_2$ mentioned in Table 2 are shown in FIGS. 2-1 and 2-2.

The obtained copolymer solutions were diluted and coated on foamed vinyl chloride leathers in the same manner as in Example 1. In the cases of copolymers $b_2$, $b'_2$, $c'_2$ and $e_2$, whitening was observed on the coated surfaces. In the anti-flex test of the coated leathers with Flexometer, the leathers coated with copolymers $b_2$, $b'_2$, $c_2$, $c'_2$ and $e_2$ had cracks on the surfaces after 200,000 runs.

EXAMPLE 3

A polymer solution was obtained in the same manner as in Example 1, except that 10.0 g of 4,4'-diphenylmethane diisocyanate (hereinafter referred to as MDI) was used in place of 8.5 g of lysine diisocyanate methyl ester. The polymer solution (hereinafter referred to as copolymer $a_3$) was inferior with regard to resistance to light as compared with copolymer $a_1$, but the film prepared from copolymer $a_3$ was superior in adhesiveness and elongation to the film molded from copolymer $a_1$ (the thicknesses of these films were 0.04–0.05 mm). The film molded from copolymer $a_3$ showed the following properties:

| Elongation: | Longitudinal | 350% |
|---|---|---|
| | Lateral | 400% |
| Tensile strength: | Longitudinal | 2.0 kg/mm² |
| | Lateral | 3.0 kg/mm² |

Further, four kinds of prepolymers (prepolymers $B_3$, $C_3$, $D_3$ and $E_3$) were prepared in the same manner as in the preparation of prepolymer $A_1$, except that respectively different amounts of MDI were used. Five kinds of copolymer solutions (copolymers $b_3$, $c_3$, $c'_3$, $d_3$ and $e_3$) were prepared from prepolymers $B_3$, $C_3$, $D_3$ and $E_3$ and NCA of γ-methyl-L-glutamate according to the procedures in the production of copolymer $a_1$.

Films having a thickness of 0.04–0.05 mm were molded from the copolymers by a dry process and were tested on tensile strength and elongation. Detailed data are shown in Table 3.

Table 3

| Prepolymer | $A_3$ | $B_3$ | $C_3$ | | $D_3$ | $E_3$ |
|---|---|---|---|---|---|---|
| MDI (g) | 10.0 | 6.6 | 6.9 | | 12.5 | 14 |
| NCO/OH (equivalent) | 2.0 | 1.55 | 1.38 | | 2.5 | 2.8 |
| Copolymer | $a_3$ | $b_3$ | $c_3$* | $c'_3$** | $d_3$ | $e_3$ |
| Prepolymer | | | | | | |

Table 3-continued

| Prepolymer | | $A_3$ | $B_3$ | $C_3$ | | $D_3$ | $E_3$ |
|---|---|---|---|---|---|---|---|
| NCA of $\gamma$-methyl-L-glutamate (g/g) | | 54/73 (0.740) | 50.6/68.5 (0.740) | 50.9/68.8 (0.740) | 50.9/147 (0.345) | 56.5/76.4 (0.740) | 58/78.4 (0.740) |
| Properties of the films | Tensile strength: ($kg/mm^2$) | | | | | | |
| | Longitudinal : | 2.0 | 2.0 | 0.60 | 0.75 | 1.8 | 1.4 |
| | Lateral : | 3.0 | 2.5 | 0.70 | 0.80 | 1.9 | 1.4 |
| | Elongation : (%) | | | | | | |
| | Longitudinal : | 500 | 500 | 350 | 350 | 300 | 280 |
| | Lateral : | 550 | 550 | 400 | 400 | 350 | 300 |

*cf Uchida et al USP 3,655,628, Example 4
**cf Uchida et al USP 3,655,628, Example 2

Figure 31:
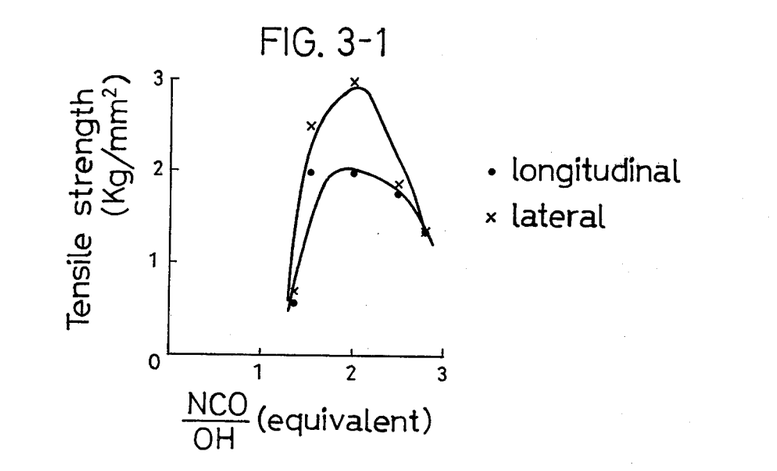
Figure 32:
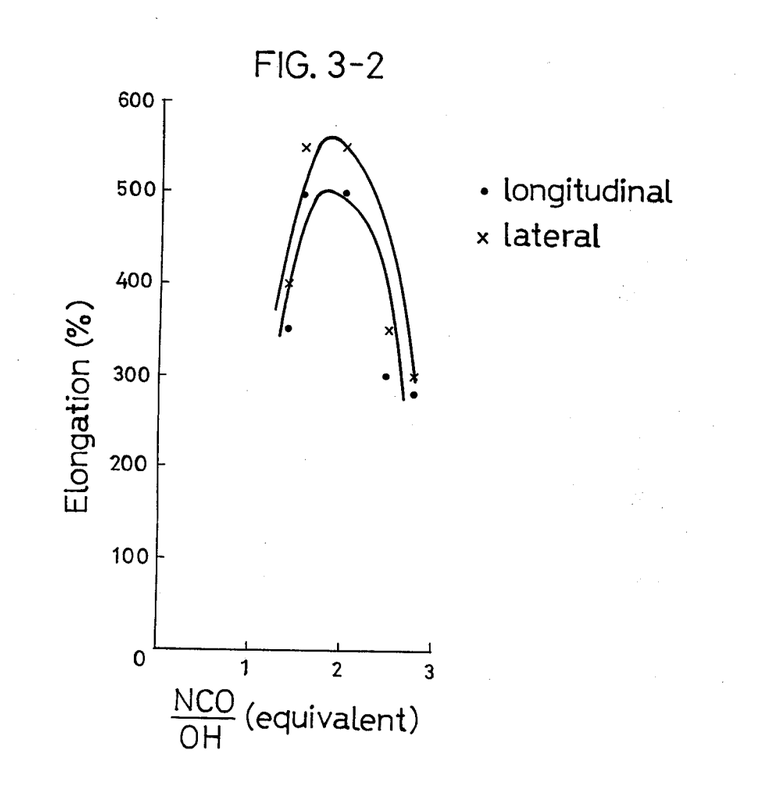

FIGS. 3-1 and 3-2 show the relations between the ratios of NCO/OH and the properties of the films molded from copolymers $a_3$, $b_3$, $c_3$, $d_3$ and $e_3$ mentioned in Table 3.

The obtained copolymer solutions were diluted and coated on foamed vinylchloride leathers in the same manner as in Example 1. In the anti-flex test of the coated leathers with Flexometer, the leathers coated with copolymers $c_3$ and $c'_3$ had cracks on their surfaces after 150,000 runs and the leather coated with copolymer $e_3$ had cracks after 200,000 runs, whereas the leathers coated with copolymers $a_3$, $b_3$ and $d_3$ exhibited no crack after 250,000 runs.

After treated with a weather-ometer having a xenon lamp (2 KW) for the periods of 20 hours and 50 hours, the coated leathers obtained in Examples 1, 2 and 3 were subjected to the anti-flex test with Flexometer. The result is shown in the following Table 4.

ther, it is also apparent from Table 4 that the copolymers obtained by using aliphatic polyisocyanate were superior.

EXAMPLE 4

Prepolymers $A_4$, $B_4$, $C_4$, $D_4$, $A'_4$, $B'_4$, $C'_4$ and $D'_4$ having terminal NCO groups were prepared by reacting polyethylene glycols respectively having average molecular weights of 400 and 600 (hereinafter referred to as PEG-400 and PEG-600, respectively) with LDIM at 100°C for 60 minutes, respectively, in the amounts shown in the below-mentioned Tables 5-(1) and 5-(2). N,N-dimethylformamide (DMF), an NCA of $\gamma$-methyl-L-glutamate and ethylene dichloride (EDC) were added to the obtained prepolymers and the mixtures were stirred. Triethylamine (TEA) was added thereto and reaction was carried out at 20°C for 10 hours. The resulting reaction solutions were heated to 80°C for 1 hour and thereafter cooled, whereby viscous solutions (copolymers $a_4$, $b_4$, $c_4$, $d_4$, $e_4$, $a'_4$, $b'_4$, $c'_4$, $d'_4$ and $e'_4$) were obtained.

The thus obtained solutions were molded into films having a thickness of 0.04–0.05 mm. Physical properties of the films are also shown in Tables 5-(1) and 5-(2).

Table 4

| Coating Copolymer | | Period of the treatment Flexion | 20 hours | | 50 hours | |
|---|---|---|---|---|---|---|
| | | | 50,000 runs | 150,000 runs | 50,000 runs | 150,000 runs |
| | $a_1$ | $\frac{NCO}{OH} = 2.0$ | o | o | o | o |
| | $b_1$ ( " | 1.6) | o | o | o | o |
| Exam. 1 | $c_1$ ( " | 1.4) | o | o | o - Δ | Δ |
| | $c'_1$( " | 1.4) | o | o | o - Δ | Δ |
| | $d_1$ ( " | 1.6) | o | o | o | o |
| | $e_1$ ( " | 2.8) | o | o | o - Δ | Δ |
| | $a_2$ ( " | 2.42) | o | o | o | o |
| | $b_2$ ( " | 1.4) | o | o | Δ | x |
| Exam. 2 | $b'_2$( " | 1.4) | o | o | Δ | x |
| | $c_2$ ( " | 0.7) | o | o | Δ | x |
| | $c'_2$( " | 0.7) | o | o | Δ | x |
| | $d_2$ ( " | 1.6) | o | o | o | o |
| | $e_2$ ( " | 2.8) | o | o | Δ | x |
| | $a_3$ ( " | 2.0) | o | Δ | Δ | x |
| | $b_3$ ( " | 1.55) | o | Δ | Δ | x |
| Exam. 3 | $c_3$ ( " | 1.38) | Δ | x | x | x |
| | $c'_3$( " | 1.38) | Δ | x | x | x |
| | $d_3$ ( " | 2.5) | o | Δ | Δ | x |
| | $e_3$ ( " | 2.8) | Δ | x | x | x | o : No abnormal state was observed on the surface.
Δ : Some cracks were observed on the surface.
x : Many cracks were observed on the surface, or the surface was destroyed.

As apparent from this Table, the amino aciduréthane copolymers produced according to the present process, i.e. those obtained by using the prepolymers wherein the ratio of NCO to OH were 1.6 to 2.5, were superior to those obtained by using the other prepolymers. Fur- Table 5 - (1)

| Prepolymer | | $A_4$ | $B_4$ | $C_4$ | $D_4$ | $E_4$ |
|---|---|---|---|---|---|---|
| PEG-400 (g) | | 8 | 8 | 12 | 8 | 8 |
| LDIM (g) | | 8.5 | 6.8 | 8.5 | 10.6 | 11.9 |
| NCO/OH (equivalent) | | 2.0 | 1.6 | 1.33 | 2.5 | 2.8 |
| Copolymer | | $a_4$ | $b_4$ | $c_4$ | $d_4$ | $e_4$ |
| NCA (g) | | 32.4 | 29.1 | 40.3 | 36.5 | 39.1 |
| DMF (g) | | 37.0 | 33.3 | 41.0 | 41.8 | 44.7 |
| EDC (g) | | 335 | 301 | 416 | 377 | 404 |
| TEA (g) | | 0.35 | 0.32 | 0.44 | 0.39 | 0.42 |
| Prepolymer NCA of γ-methyl-L-glutamate (g/g) | | 16.5/32.4 (0.509) | 14.8/29.1 (0.509) | 20.5/40.3 (0.509) | 18.6/36.5 (0.509) | 19.9/39.1 (0.509) |
| Properties of the films | Tensile strength (kg/mm²) Longitudinal : | 1.0 | 0.9 | 0.6 | 0.9 | 0.7 |
| | Lateral : | 1.1 | 1.0 | 0.7 | 1.1 | 0.6 |
| | Elongation (%) Longitudinal : | 350 | 320 | 200 | 350 | 250 |
| | Lateral : | 400 | 360 | 100 | 370 | 260 |

Figure 41:
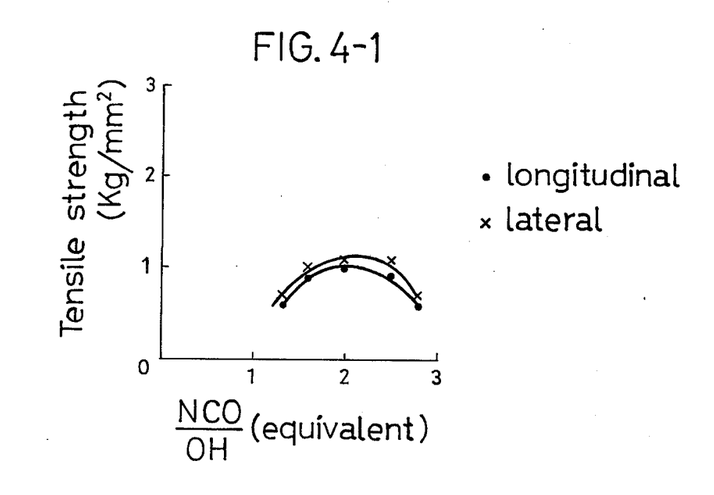
Figure 42:
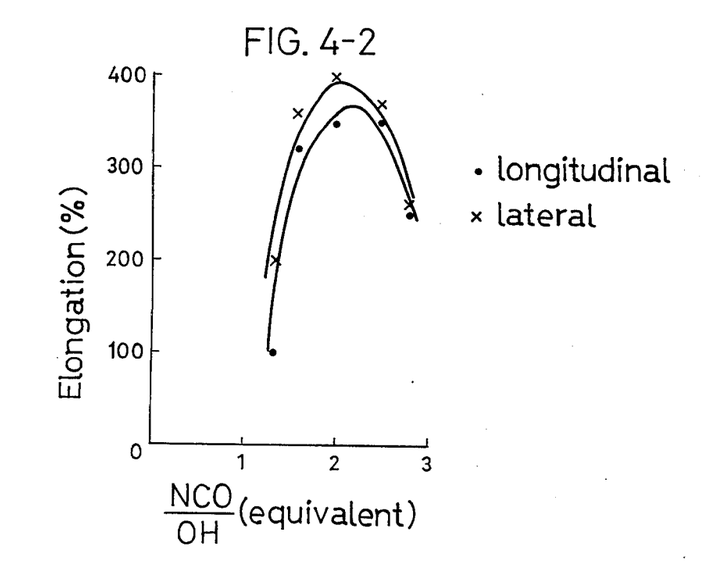

FIGS. 4-1 and 4-2 show the relations between the ratios of NCO/OH and the properties of the films mentioned in Table 5-(1).

Table 5 -(2)

| Prepolymer | | $A'_4$ | $B'_4$ | $C'_4$ | $D'_4$ | $E'_4$ |
|---|---|---|---|---|---|---|
| PEG-600 (g) | | 12 | 12 | 21 | 12 | 8.6 |
| LDIM (g) | | 8.5 | 6.8 | 8.5 | 10.6 | 8.5 |
| NCO/OH (equivalent) | | 2.0 | 1.6 | 1.4 | 2.5 | 2.8 |
| Copolymer | | $a'_4$ | $b'_4$ | $c'_4$ | $d'_4$ | $e'_4$ |
| NCA (g) | | 62.1 | 57 | 90 | 68.5 | 51.8 |
| DMF (g) | | 61.5 | 56.4 | 88 | 67.8 | 51.3 |
| EDC (g) | | 551 | 505 | 797 | 607 | 459 |
| TEA (g) | | 0.34 | 0.31 | 0.48 | 0.37 | 0.28 |
| Prepolymer NCA of γ-methyl-L-glutamate (g/g) | | 20.5/62.1 (0.330) | 18.8/57 (0.330) | 29.5/90 (0.330) | 22.6/68.5 (0.330) | 17.1/51.8 (0.330) |
| Properties of the films | Tensile strength (kg/mm²) Longitudinal : | 1.0 | 0.8 | 0.5 | 0.9 | 0.6 |
| | Lateral : | 1.1 | 0.9 | 0.6 | 0.9 | 0.6 |
| | Elongation (%) Longitudinal : | 280 | 230 | 150 | 200 | 150 |
| | Lateral : | 300 | 250 | 170 | 220 | 170 |

Figure 51:
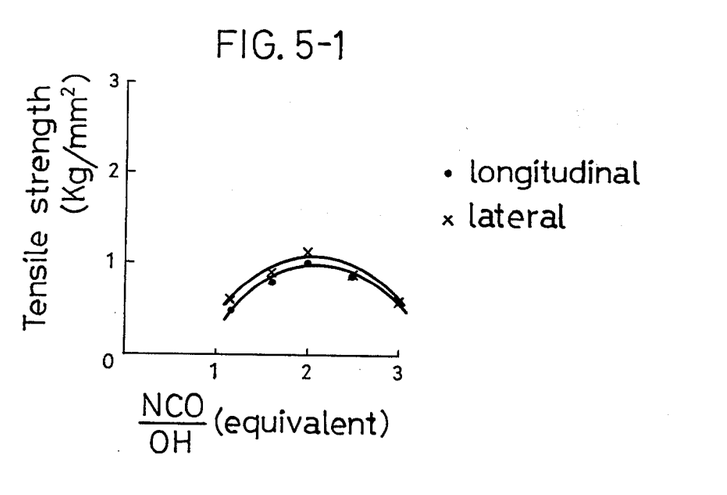
Figure 52:
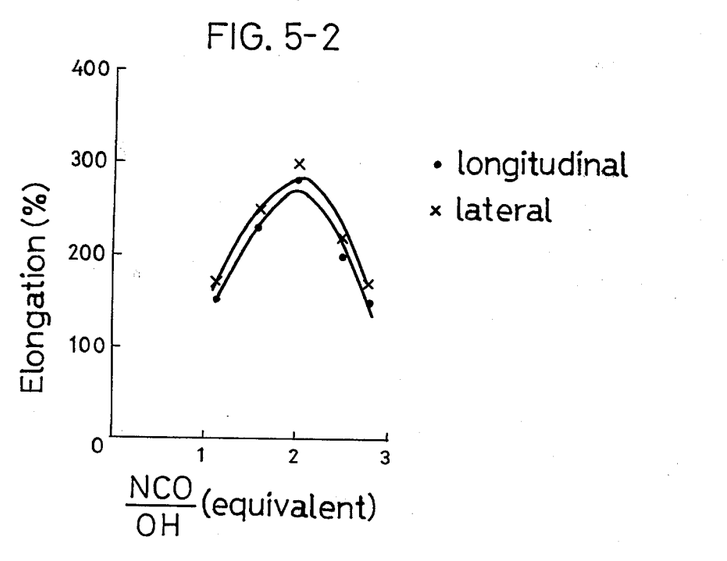

FIGS. 5-1 and 5-2 show the relations between the ratios of NCO/OH and the properties of the films mentioned in Table 5-(2).

The obtained copolymer solutions were diluted with EDC. The resulting diluted solutions were coated on foamed polyvinylchloride leathers. The result of the comparison in respect of touch and feeling between the obtained leathers is as hereunder:

$a'_4 > b'_4 \approx d'_4 \approx a_4 > d_4 > b_4 > c_4 > c'_4 > e_4 \approx e'_4$ In the anti-flex test of the obtained leathers, the leathers coated with copolymers $c_4$, $c'_4$ and $e'_4$ had cracks after 80,000 runs, and the leather coated with copolymer $e_4$ had cracks after 100,000 runs. Whereas, the leathers coated with copolymers $d_4$, $a_4$, $b_4$, $b'_4$, $a'_4$ and $d'_4$ exhibited no crack under the same conditions.

EXAMPLE 5

1500 g of EDC and 150 g of NCA of γ-methyl-L-glutamate were poured into a four-necked flask equipped with an agitator, a reflux condenser and a calcium chloride cylinder, and 4.0 g of TEA was added thereto. Polymerization was carried out at 5°C for 3 hours to obtain a poly-γ-methyl-L-glutamate solution.

The resulting solution was divided into ten equal parts.

Five kinds of prepolymers (prepolymers $A_5$, $B_5$, $C_5$, $D_5$ and $E_5$) were prepared by reacting MDI with PEG-600 in such a flask as above-mentioned at 80°–100°C for 1 hour.

20 g each of these prepolymers was added to one part of the poly-γ-methyl-L-glutamate solution together with 134 g of EDC. Further, 12.7 g each of prepolymers $A_5$, $D_5$ and $E_5$ was added to one part of the poly-γ-methyl-L-glutamate solution together with 68 g of EDC. The obtained mixtures were subjected to polymerization for 10 hours at 30°C. Thus, eight kinds of copolymer solutions (copolymers $a_5$, $a'_5$, $b_5$, $c_5$, $d_5$, $d'_5$, $e_5$ and $e'_5$) were prepared.

Films having a thickness of 0.04–0.05 mm were molded from the thus obtained copolymers by a dry process and were tested on tensile strength and elongation. Detailed data are shown in Table 6.

Table 6

| Prepolymer | $A_5$ | | $B_5$ | $C_5$ | $D_5$ | | $E_5$ | |
|---|---|---|---|---|---|---|---|---|
| MDI (g) | 25 | | 19.4 | 25 | 31.3 | | 35 | |
| PEG-600 (g) | 30 | | 30 | 43 | 30 | | 30 | |
| NCO/OH (equivalent) | 2.0 | | 1.55 | 1.4 | 2.5 | | 2.8 | |
| Copolymer | $a_5$ | $a'_5$ | $b_5$ | $c_5$ | $d_5$ | $d'_5$ | $e_5$ | $e'_5$ |
| Prepolymer NCA of | 20/15 | 12.7/15 | 20/15 | 20/15 | 20/15 | 12.7/15 | 20/15 | 12.7/15 |

Table 6-continued

| Prepolymer | | $A_5$ | $B_5$ | $C_5$ | | $D_5$ | | $E_5$ |
|---|---|---|---|---|---|---|---|---|
| γ-methyl-L-glutamate (g/g) | | (1.33) | (0.847) | (1.33) | (1.33) | (1.33) | (0.847) | (1.33) | (0.847) |
| Viscosity of the copolymers (c.p.s.) | | 1,000 | 800 | 1,000 | 1,200 | 1,200 | 1,000 | 1,300 | 1,100 |
| Properties of the films | Tensile strength (kg/mm²) | | | | | | | | |
| | Longitudinal: | 1.6 | 1.9 | 1.7 | 1.2 | 1.4 | 1.8 | 0.9 | 1.0 |
| | Lateral: | 1.8 | 2.0 | 1.7 | 1.3 | 1.5 | 1.9 | 0.9 | 1.2 |
| | Elongation (%) | | | | | | | | |
| | Longitudinal: | 700 | 800 | 650 | 500 | 500 | 750 | 200 | 300 |
| | Lateral: | 750 | 850 | 700 | 550 | 550 | 800 | 250 | 350 |

Figure 61:
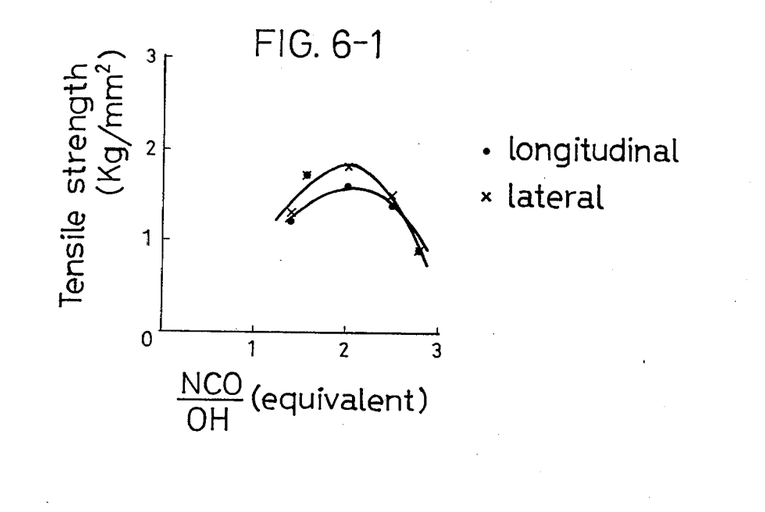
Figure 62:
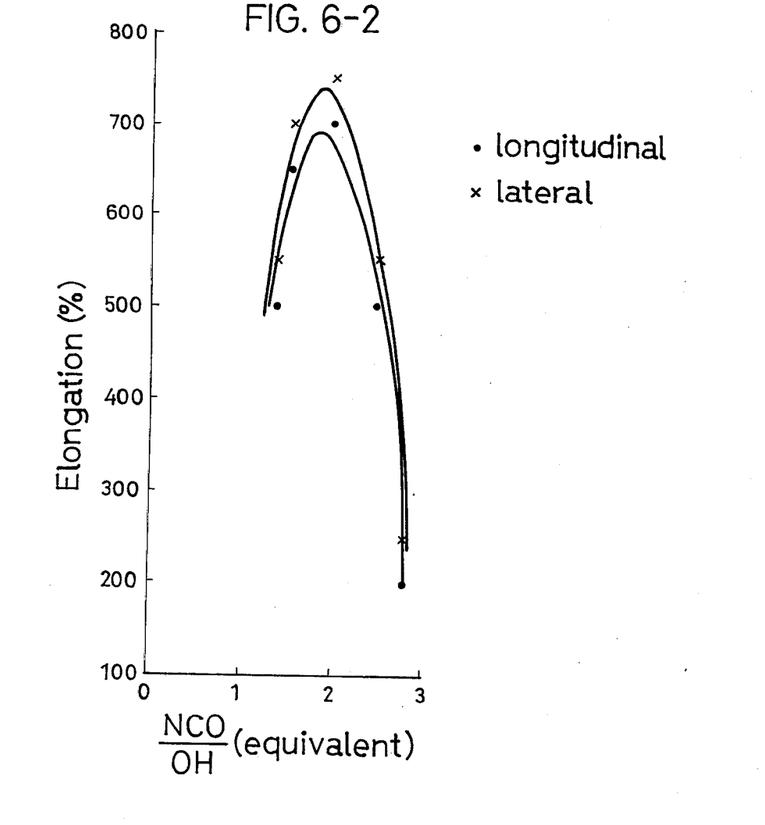

FIGS. 6-1 and 6-2 show the relations between the ratios of NCO/OH and the properties of the films molded from copolymers $a_5$, $b_5$, $c_5$, $d_5$ and $e_5$ mentioned in Table 6.

Each of the obtained copolymer solutions was diluted with a mixture EDC and DMF (9:1) by 4 to 10 times the volume. The resulting diluted solutions were coated on foamed polyvinylchloride leathers. In the anti-flex test of the coated leathers, the leathers coated with copolymers $e_5$ and $e'_5$ had cracks after 70,000 runs. The leather coated with copolymer $c_5$ had cracks after 100,000 runs, whereas the leathers coated with copolymers $a_5$, $b_5$, $d_5$, $a'_5$ and $d'_5$ exhibited no crack. Further, the leathers coated with copolymers $a'_5$ and $d'_5$ exhibited no crack even after 200,000 runs.

EXAMPLE 6

A poly-γ-methyl-L-glutamate solution was prepared in the same manner as in Example 5 and divided into ten equal parts.

Five kinds of prepolymers (prepolymers $A_6$, $B_6$, $C_6$, $D_6$ and $E_6$) were prepared by reacting MDI with polyoxytetramethylene glycol having an average molecular weight of 1,000 (referred to as PTG-1000) under the same reaction conditions as in Example 5.

12.7 g each of the obtained prepolymers was added to one part of the poly-γ-methyl-L-glutamate solution together with 68 g of EDC. Further, 20 g of prepolymer $A_6$ was added to 1 part of the poly-γ-methyl-L-glutamate solution together with 134 g of EDC. The obtained mixtures were subjected to polymerization under the same reaction conditions as in Example 5. Thus, six copolymer solutions (copolymers $a_6$, $a'_6$, $b_6$, $c_6$, $d_6$ and $e_6$) were obtained.

Films having a thickness of 0.04–0.05 mm were molded from the obtained copolymers and were tested on tensile strength and elongation. Detailed data are shown in Table 7.

Further, each of the obtained copolymer solutions was diluted with a mixture of EDC and DMF (9:1) by 3 to 5 times the volume. The resulting solutions were coated on foamed polyvinyl chloride leathers. The result of the comparison on touch and feeling between the resulting leathers is as hereunder:

$a_6 \approx b_6 > a'_6 \approx d'_6 >> c_6 >> e_6$

The leathers were subjected to the anti-flex test with Flexometer. The result of this test is also shown in the following Table 7.

Table 7

| Prepolymer | | $A_6$ | | $B_6$ | $C_6$ | $D_6$ | $E_6$ |
|---|---|---|---|---|---|---|---|
| MDI (g) | | 50 | | 50 | 50 | 62.5 | 70 |
| PTG-1000 (g) | | 100 | | 110 | 143 | 100 | 100 |
| NCO/OH (equivalent) | | 2.0 | | 1.8 | 1.4 | 2.5 | 2.8 |
| Copolymer | | $a_6$ | $a'_6$ | $b_6$ | $c_6$ | $d_6$ | $e_6$ |
| Prepolymer NCA of γ-methyl-L-glutamate (g/g) | | 12.7/15 (0.847) | 20/15 (1.33) | 12.7/15 (0.847) | 12.7/15 (0.847) | 12.7/15 (0.847) | 12.7/15 (0.847) |
| Properties of the films | Tensile strength (kg/mm²) | | | | | | |
| | Longitudinal: | 1.8 | 1.5 | 1.7 | 1.3 | 1.4 | 1.0 |
| | Lateral: | 2.0 | 1.6 | 1.7 | 1.4 | 1.5 | 1.1 |
| | Elongation (%) | | | | | | |
| | Longitudinal: | 800 | 700 | 600 | 500 | 750 | 400 |
| | Lateral: | 850 | 750 | 650 | 550 | 800 | 450 |
| Anti-flex test: State of the surfaces of the leathers after 100,000 runs | | No cracks | No cracks | No cracks | Cracks were observed. | No cracks | Cracks were observed. |

Figure 71:
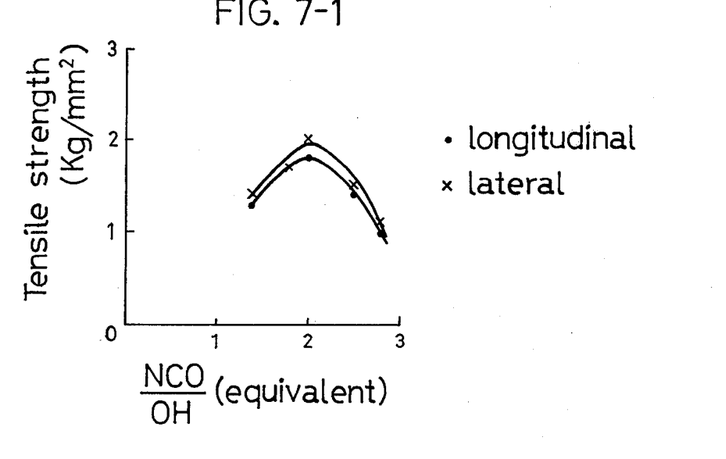
Figure 72:
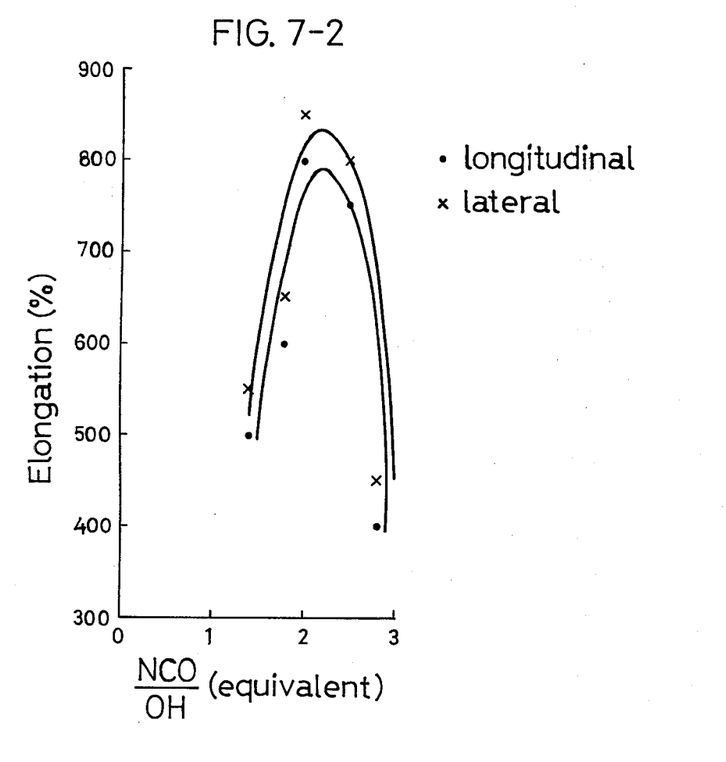

FIGS. 7-1 and 7-2 show the relations between the ratios of NCO/OH and the properties of the films molded from copolymers $a_6$, $b_6$, $c_6$, $d_6$ and $e_6$ mentioned in Table 7.

EXAMPLE 7

1500 g of EDC and 150 g of an NCA of γ-methyl-L-glutamate were poured into a four-necked flask equipped with an agitator, a reflux condenser, a calcium cylinder and a thermometer and then 3 g of TEA was added thereto. Polymerization was carried out at 0°C for 4 hours. The resulting polymerization solution was divided into 10 equal parts.

Poly-γ-methyl-L-glutamate was isolated from the obtained polymerization solution and thereafter the poly-γ-methyl-L-glutamate was dissolved in dichloroacetate at 25°C. The reduced viscosity of the dichloroacetate solution, i.e. $\eta sp/c = 0.5$ of the solution was 0.5.

Five kinds of prepolymers (prepolymer $A_7$, $B_7$, $C_7$, $D_7$ and $E_7$) were prepared by reacting LDIM with polyoxytetramethylene glycol having an average molecular weight of 2200 (referred to as PTG-2200) for one hour at 90°–100°C.

12.7 g each of the obtained prepolymers was added to one part of the poly-γ-methyl-L-glutamate solution together with 68 g of EDC. The obtained mixtures were subjected to polymerization for 10 hours at 30°C. Thus, five copolymer solutions (copolymers $a_7$, $b_7$, $c_7$, $d_7$ and $e_7$) were obtained.

Films having a thickness of 0.04—0.05 mm were molded from the obtained copolymers and were tested on tensile strength and elongation. Detailed data are shown in Table 8.

Table 8

| Prepolymer | | $A_7$ | $B_7$ | $C_7$ | $D_7$ | $E_7$ |
|---|---|---|---|---|---|---|
| LDIM (g) | | 8.5 | 6.8 | 5.94 | 10.6 | 11.9 |
| PTG-2200 (g) | | 44 | 44 | 44 | 44 | 44 |
| NCO/OH (equivalent) | | 2.0 | 1.6 | 1.4 | 2.5 | 2.8 |
| Copolymer | | $a_7$ | $b_7$ | $c_7$ | $d_7$ | $e_7$ |
| Prepolymer NCA of γ-methyl-L-glutamate (g/g) | | 12.7/15 (0.847) | 12.7/15 (0.847) | 12.7/15 (0.847) | 12.7/15 (0.847) | 12.7/15 (0.847) |
| Properties of the films | Tensile strength (kg/mm²) | | | | | |
| | Longitudinal : | 1.2 | 1.0 | 0.8 | 1.0 | 0.8 |
| | Lateral : | 1.3 | 1.1 | 0.9 | 1.0 | 0.8 |
| | Elongation (%) | | | | | |
| | Longitudinal : | 500 | 350 | 200 | 400 | 300 |
| | Lateral : | 550 | 400 | 210 | 450 | 330 |

Figure 81:
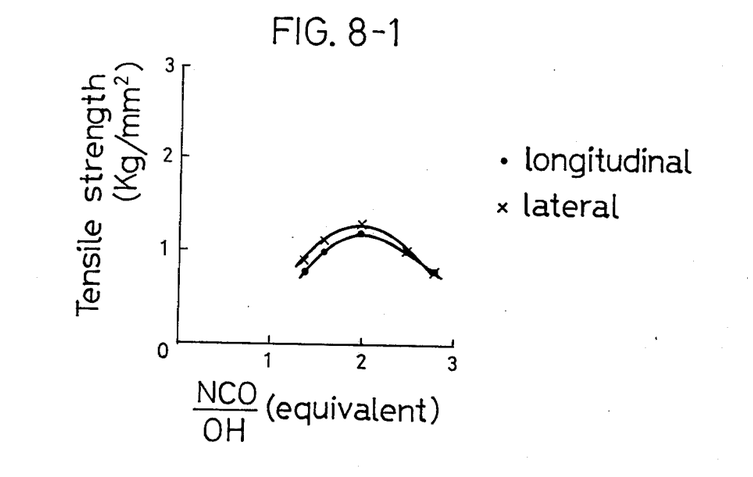
Figure 82:
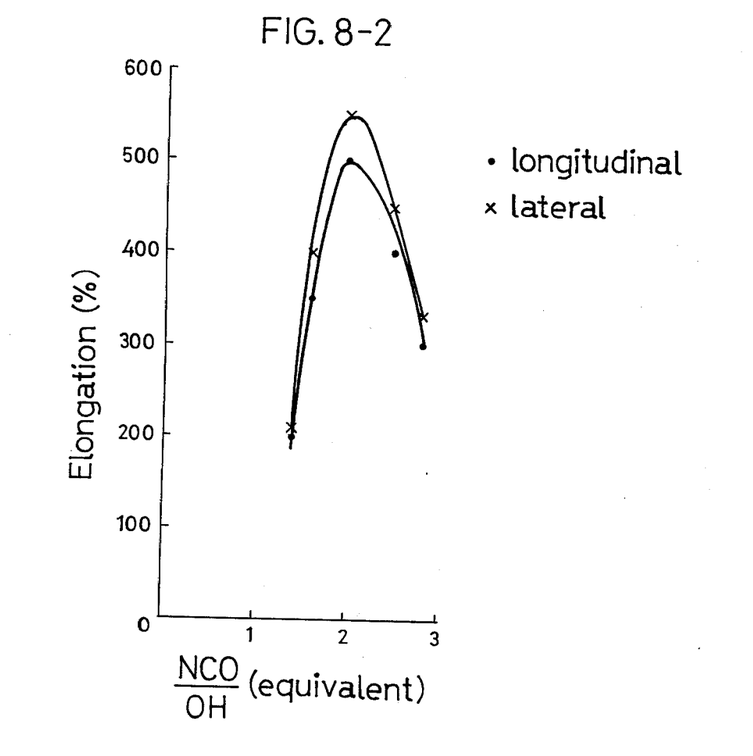

FIGS. 8-1 and 8-2 show the relations between the ratios of NCO/OH and the properties of the films mentioned in Table 8.

EXAMPLE 8

200 g of polyoxypropylene glycol having a molecular weight of 1,500 was mixed with 48 g of tolylene diisocyanate (NCO/OH = 2.0). The resulting mixture was heated at a temperature of 100°C for 4 hours with stirring, whereby a prepolymer having isocyanate groups at the terminal positions was obtained. Then, 800 g of ethylene dichloride was immediately added thereto, and successively 250 g of $N^\epsilon$-carbobenzoyl-L-lysine-N-carboxylic acid anhydride was added thereto. After stirring at room temperature for one hour, 150 g of N,N-diethylacetamide was added thereto. After the addition of 2.35 g of a polymerization initiator (tri-n-butylamine), stirring was continued for 15 hours. Then, the temperature was elevated to near the boiling point by heating, and reaction was carried out for one hour, whereby a viscous solution of copolymer was obtained. The resulting solution was inferior in its resistance to light as compared with the copolymer solution of Example 1, but the film prepared therefrom was superior in adhesiveness and elongation properties with respect to the film of poly-$N^\epsilon$-carbobenzoxy-L-lysine alone.

EXAMPLE 9

24 g of polyoxylhexamethylene glycol having a molecular weight of 2,000 and 5.0 g of lysine diisocynate methyl ester were mixed (NCO/OH = 1.97). The resulting mixture was stirred at 80°C for 1 hour, and then dissolved in 80 g of N,N-dimethylformamide, whereby a prepolymer having isocyanate groups at the terminals was synthesized. Then, 40 g of chloroform and 40 g of dioxane were added thereto, and, furthermore, 20 g of β-alanine-N-carboxylic acid anhydride was also added thereto. After the addition of 0.3 g of the polymerization initiator, triethylenediamine, stirring was continued for 5 hours. Then, the temperature was elevated to close to the boiling point by heating, and the reaction was continued for 2 hours, whereby a viscous solution of copolymer was obtained. The film prepared from the solution had very excellent adhesiveness and elongation properties, similar to those of the copolymer of Example 1.

EXAMPLE 10

50 g of dioxane was added to 24 g of polyoxyhexamethylene glycol having a molecular weight of 2,000 and 3.0 g of lysine diisocyanate methyl ester (NCO/OH = 1.18). The mixture was stirred at 80°C for 1 hour, whereby a prepolymer having isocyanate groups at the terminal positions was obtained. Then, a polymerization solution separately prepared by polymerizing 90.0 g of γ-benzyl-D-glutamate-N-carboxylic acid anhydride in 600 g of ethane dichloride, using 1.0 g of triethylamine as a polymerization initiator, was immediately added thereto. This solution mixture was heated at 75°–80°C for 1 hour with stirring, whereby a copolymerization solution having a viscosity of 2,000–3,000 c.p.s. was obtained. The film obtained from the copolymerization solution according to the conventional method had physical properties similar to those of the film obtained in Example 1 and had better elongation and adhesiveness properties than the film of poly-γ-benzyl-D-glutamate.

A prepolymer (NCO/OH = 2) was prepared in the same manner as above, except that 5.1 g of lysine diisocyanate methyl ester was used in place of 3 g of lysine diisocyanate methyl ester. γ-benzyl-D-glutamate-urethane copolymer solution was produced using this prepolymer in the same manner as above, except that 97 g of γ-benzyl-D-glutamate-N-carboxylic acid anhydride was used.

When the film of the γ-benzyl-D-glutamate-urethane copolymer obtained by using the prepolymer having the ratio of NCO/OH of 1.18 was compared in physical properties with that of γ-benzyl-D-glutamate-urethane copolymer obtained by using the prepolymer having the ratio of NCO/OH of 2.0, the latter was superior to the former in both tensile strength and elongation.

EXAMPLES 11–15

Prepolymers were prepared in accordance with the following method, using the components shown in Table 9.

A diisocyanate component, a solvent X and a catalyst were added to a polyether diol component, and a prepolymer was obtained by stirring at 80°–100°C for 60 minutes.

A solvent Y shown in Table 10 was added to the prepolymer and then admixed with the ANCA component. Stirring was carried out at room temperature for 1 hour, a polymerization initiator was then added thereto, and the reaction was continued for 10 hours. A copolymer solution was obtained by heat treatment at 80°C for 1 hour. The colorless, transparent film prepared from the solution was greatly improved with respect to elongation and adhesiveness properties, as compared with the film obtained from the polyamino acid polymer alone.

In Example 14, four kinds of copolymer solutions were produced by using the prepolymers having the ratios of NCO/OH of 1.55, 1.65, 1.95 and 2.7, respectively. As a result of the comparison of the physical properties of the films prepared from the four copolymers solutions, it was found that so far as elongation and tensile strength are concerned, the films in 14-(i), (ii) and (iii) are superior to that in 14-(iv), and the film in 14-(iii) is superior to those in 14-(i) and (ii).

The invention being thus described, it will be obvious that the same may be varied in many ways. Such variations are not to be regarded as a departure from the spirit and scope of the invention, and all such modifications as would be obvious to one skilled in the art are intended to be included herein.

Table 9

| Example | Diisocyanate component | Polyetherdiol component | NCO/OH (equivalent) | Catalyst | Solvent X |
|---|---|---|---|---|---|
| 11 | 4,4'-Diphenyl-methane diisocyanate 10 g | Polyoxytetramethylene glycol (MW 1350) 24 g | 2.26 | None | Dioxane 40 g |
| 12 | 2,4-Tolylene diisocyanate 28 g | Polyoxypropylene glycol (MW 1500) 100 g | 2.42 | None | N,N-dimethylformamide 30 g Dioxane 30 g |
| 13 | Lysine diisocyanate ethyl ester 8.5 g | Polyoxybutylene glycol (MW 2000) 40 g | 1.63 | Triethylamine 0.05 g | N,N-diethylformamide 30 g |
| 14 (i) | 4,4'-Diphenyl-methane diisocyanate 8.5 g | Polyoxypentamethylene glycol (MW 1600) 35 g | 1.55 | None | Dioxane 30 g |
| (ii) | " | " 33 g | 1.65 | " | " |
| (iii) | " | " 29.4 g | 1.95 | " | " |
| (iv) | " | " 20.1 g | 2.7 | " | " |
| 15 | Lysine diisocyanate methyl ester 9.0 g | Polyoxytetramethylene oxyethylene glycol (MW 2000) 40 g | 2.12 | " | " |

Table 10

| Example | ANCA component | Solvent Y | Polymerization initiator |
|---|---|---|---|
| 11 | γ-Ethyl-L-glutamate NCA 75 g | Perchlene 150 g Ethane dichloride 450 g | Triethylamine 1.5 g |
| 12 | γ-Isobutyl-L-glutamate NCA 70 g | Trichlene 800 g | Tri-n-butylamine 1.0 g |
| 13 | γ-Cyclohexyl-L-glutamate NCA 70 g | Ethane dichloride 850 g | Diethylamine 1.3 g |
| 14 (i) | NCA of γ-methyl-D-glutamate 30 g NCA of D-alanine 40 g | N,N-dimethylformamide 200 g 1,2-dichloroethane 350 g | Diethylamine 1.5 g |
| (ii) | NCA of γ-methyl-D-glutamate 27.9 g NCA of D-alanine 38.2 g | " | 1.42 g |
| (iii) | NCA of γ-methyl D-glutamate 26.2 g NCA of D-alanine 34.8 g | " | 1.36 g |
| (iv) | NCA of γ-methyl-D-glutamate 19.7 g NCA of D-alanine 26.3 g | " | 0.96 g |
| 15 | O¹,O²-di(γ-glutamyl) ethylene glycol NCA 60 g | Dimethyl sulfoxide 100 g Ethane dichloride 700 g | Triethylamine 2.1 g |

What is claimed is:

1. A process for producing an amino acid-urethane copolymer which comprises polymerizing (I) a prepolymer having isocyanate groups, which is prepared by reacting a polyether polyol having hydroxyl groups substantially at the terminals thereof selected from the group consisting of (a) ring-cleaved polymers of alkylene oxides having 2 to 8 carbon atoms, (b) mixtures of said ring-cleaved polymers, (c) condensates of said alkylene oxides and alkylene glycols having 2 to 6 carbon atoms and (d) condensates of one or more of said alkylene glycols with an organic polyisocyanate in a ratio in equivalent of the organic polyisocyanate to the polyether polyol of 1.6 to 2.5, with (II) an amino acid-N-carboxylic acid anhydride having the formula:

(wherein R and R¹ are hydrogen atoms or monovalent organic residues, and R² and R³ are divalent organic residues).

2. The process of claim 1, wherein said organic polyisocyanate is a diisocyanate.

3. The process of claim 1, wherein said polyether polyol has a molecular weight of about 400 to 2,000.

4. The process of claim 1, wherein said polyether polyol has from 4 to 6 —CH₂— groups as repeating units in the linear chain.

5. The process of claim 1, wherein said organic polyisocyanate is an organic diisocyanate containing at least one ester group.

6. The process of claim 1, wherein said organic polyisocyanate is an aliphatic diisocyanate containing an alkyl ester group.

7. The process of claim 6, wherein said aliphatic diisocyanate is selected from the group consisting of lysine diisocyanate alkyl ester and ornithine diisocyanate alkyl ester.

8. The process of claim 1, wherein the reaction of the polyether polyol with the organic polyisocyanate is carried out in the presence of a catalyst.

9. The process of claim 1, wherein from 0.2 to 2.0 parts by weight of the amino acid-N-carboxylic acid anhydride is employed per 1 part by weight of the prepolymer having isocyanate groups.

10. The process of claim 1, wherein the polymerization of the prepolymer with the amino acid-N-carboxylic acid anhydride is carried out at a temperature of about 0° to 200°C.

11. The process of claim 1, wherein the polymerization of the prepolymer with the amino acid-N-carboxylic acid anhydride is carried out at a temperature of about 0° to 100°C.

12. The process of claim 1, wherein the polymerization of the prepolymer with the amino acid-N-carboxylic acid anhydride is carried out in the presence of a polymerization initiator.

13. The process of claim 12, wherein the amount of the polymerization initiator is 0.005 to 1.0 mol per mol of the amino acid-N-carboxylic acid anhydride.

14. An amino acid-urethane copolymer produced by polymerizing (I) a prepolymer having isocyanate groups, which is prepared by reacting a polyether polyol (molecular weight: 300 - 5,000) having hydroxyl groups substantially at the terminals thereof selected from the group consisting of (a) ring-cleaved polymers of alkylene oxides having 2 to 8 carbon atoms, (b) mixtures of said ring-cleaved polymers, (c) condensates of said alkylene oxides and alkylene glycols having 2 to 6 carbon atoms and (d) condensates of one or more of said alkylene glycols with an organic polyisocyanate in a ratio in equivalent of the organic polyisocyanate to the polyether polyol of 1.6 to 2.5, with (II) an amino acid-N-carboxylic acid anhydride having the formula:

(wherein R and R¹ are hydrogen atoms or monovalent organic residues, and R² and R³ are divalent organic residues).

15. An amino acid-urethane copolymer in accordance with claim 14, wherein said organic polyisocyanate is a diisocyanate.

16. An amino acid-urethane copolymer in accordance with claim 15, wherein said diisocyanate is an aliphatic diisocyanate containing at least one alkyl ester group.

17. An artificial leather comprising the amino acid-urethane copolymer of claim 14 and a woven or nonwoven fabric substrate.

18. An artificial leather in accordance with claim 17, wherein the substrate is a cotton cloth.

19. A film comprising the amino acid-urethane copolymer of claim 14.

* * * * *